US005870577A

United States Patent [19]
Patel et al.

[11] Patent Number: 5,870,577
[45] Date of Patent: Feb. 9, 1999

[54] SYSTEM AND METHOD FOR DISPATCHING TWO INSTRUCTIONS TO THE SAME EXECUTION UNIT IN A SINGLE CYCLE

[75] Inventors: Rajesh B. Patel; Soummya Mallick; Romesh Mangho Jessani, all of Austin, Tex.

[73] Assignee: International Business Machines, Corp., Armonk, N.Y.

[21] Appl. No.: 758,066

[22] Filed: Nov. 27, 1996

[51] Int. Cl.$^6$ ...................................................... G06F 9/38
[52] U.S. Cl. .......................................... 395/391; 395/393
[58] Field of Search .................................... 395/382, 389, 395/391, 393, 395, 394

[56] References Cited

U.S. PATENT DOCUMENTS

| | | | |
|---|---|---|---|
| 4,594,655 | 6/1986 | Hoa et al. ................................. | 395/394 |
| 5,269,007 | 12/1993 | Hanawa et al. .......................... | 395/394 |
| 5,325,495 | 6/1994 | McLellan ................................. | 395/395 |
| 5,465,373 | 11/1995 | Kahle et al. ............................. | 395/391 |
| 5,546,597 | 8/1996 | Martell et al. ........................... | 395/393 |

OTHER PUBLICATIONS

R.M. Tomasulo, An Efficient Algorithm for Exploiting Multiple Execution Units, IBM Journal, pp. 25–33, Jan. 1967.
William Johson, Superscalar Microprocessor Design, Prentice Hall, Section 7.1 Reservation Stations, pp. 129–133, Dec. 1991.

*Primary Examiner*—Richard L. Ellis
*Assistant Examiner*—Patrice L. Winder
*Attorney, Agent, or Firm*—Morgan & Finnegan, L.L.P.

[57] ABSTRACT

When the instruction dispatch unit detects two consecutive immediate instructions in the instruction queue directed to the same execution unit, it dispatches both during the same cycle, making use of both GPR ports for the two required GPR operands. Instruction path directing logic directs the first instruction to the execution decoder of the one execution unit during the first occurring cycle and latches the second instruction until a second occurring cycle. It also directs the first immediate operand of the first instruction to a first input of an execution block in the one execution unit during the first occurring cycle. An operand path directing logic directs the first GPR operand referred to by the first instruction to a second input of the execution block during the first occurring cycle and latches a second GPR operand referred to by the second instruction until the second occurring cycle. The instruction path directing logic directs the second instruction to the execution decoder during the second occurring cycle and directs the second immediate operand of the second instruction to the first input of the execution block during the second occurring cycle. The operand path directing logic directs the second GPR operand to the second input of the execution block during the second occurring cycle. In this manner, two instructions are dispatched in a single cycle from the instruction queue to one execution unit of the multiple execution unit parallel computer.

20 Claims, 11 Drawing Sheets

| CYCLE 1 | CYCLE 2 | CYCLE 3 | CYCLE 4 |
|---|---|---|---|
| DISPATCH BOTH FIRST INSTR. "ADD_IM" AND SECOND INSTR. "SUB_IM" TO FXU | EXECUTE FIRST INSTR. "ADD_IM" AND RELEASE INSTR. "SUB_IM" IN FXU | EXECUTE SECOND INSTR. "SUB_IM" IN FXU | |
| | DISPATCH THIRD INSTR. TO LSU "LOAD" | EXECUTE THIRD INSTR. IN LSU "LOAD" | |
| | DISPATCH FOURTH INSTR. TO FPU "FADD" | EXECUTE FOURTH INSTR. IN FPU "FADD" | |

FIG. 4A PRIOR ART

| CYCLE 1 | CYCLE 2 | CYCLE 3 | CYCLE 4 |
|---|---|---|---|
| DISPATCH FIRST INSTR. TO FXU "ADD_IM" | EXECUTE FIRST INSTR. IN FXU "ADD_IM" | | |
| | DISPATCH SECOND INSTR. TO FXU "SUB_IM" | EXECUTE SECOND INSTR. IN FXU "SUB_IM" | |
| | DISPATCH THIRD INSTR. TO LSU "LOAD" | EXECUTE THIRD INSTR. IN LSU "LOAD" | |
| | | DISPATCH FOURTH INSTR. TO FPU "FADD" | EXECUTE FOURTH INSTR. IN FPU "FADD" |

SYSTEM AND METHOD FOR DISPATCHING TWO INSTRUCTIONS TO THE SAME EXECUTION UNIT IN A SINGLE CYCLE

TECHNICAL FIELD

The invention disclosed broadly relates to computer system and methods and more particularly relates to improvements in instruction dispatching for parallel processors.

BACKGROUND OF THE INVENTION

RISC architectures typically include a large, general purpose register file containing GPR operands, to minimize the need for repeated accesses to main memory. Superscaler architectures typically include an instruction dispatch unit that supplies instructions from an instruction queue to diverse parallel execution units, such as a fixed point unit, a floating point unit, a load/store unit, and other functional processing units.

Conventionally, the instruction dispatch unit in a superscaler computer issues two instructions in each cycle to two different execution units that can operate independently and in parallel. The instructions include an op code field that identifies the execution unit and the operation to be performed. The instructions also include fields specifying one or more GPR registers as sources of GPR operands and destinations of results for the operation to be performed. When the instruction dispatch unit is handling an instruction from the instruction queue, it decodes the op code to identify to which execution unit the instruction is to be dispatched. The instruction dispatch unit also signals the GPR to transfer the designated GPR operands to the identified execution unit. Some instructions designate two source GPR registers and thus the GPR has two read ports to enable the transfer of two operands during the same cycle to an execution unit.

If two consecutive instructions in the instruction queue are intended to go to the same execution unit, the second occurring instruction must be held by the instruction dispatch unit for dispatching in the next cycle. The instruction dispatch unit must therefore delay its handling of the third occurring instruction in the instruction queue until the third cycle.

SUMMARY OF THE INVENTION

It is therefore an object of the invention to more efficiently dispatch instructions in a multiple execution unit parallel computer. It is another object of the invention to dispatch two instructions in a single cycle from an instruction queue to one execution unit of the multiple execution unit parallel computer, in an improved manner.

The invention disclosed herein solves the problem of inefficient instruction dispatching for consecutive immediate instructions that already contain one of the operands within the instruction itself. An example of an immediate instruction is an "add immediate" integer instruction. It contains the op code, the identity of a destination register in the GPR, the identity of one source register in the GPR, and a field containing the second operand. If a single immediate instruction is decoded by the instruction dispatch unit, it is dispatched to the fixed point unit. The fixed point unit transfers the immediate operand contained in the instruction to the B-operand input of the execution block within the cycle. The instruction dispatch unit also signals the GPR to transfer the single designated GPR operand to the A-operand input of the add/compare execution block within the same cycle. Only one of the two read ports of the GPR is required to transfer the GPR operand.

In accordance with the invention, when the instruction dispatch unit detects two consecutive immediate instructions in the instruction queue directed to the same execution unit, it dispatches both during the same cycle, making use of both GPR ports for the two required GPR operands. The instruction dispatch unit includes detection logic to detect whether the next two instructions in the instruction queue are immediate instructions to the same execution unit.

Further in accordance with the invention, instruction logic is included in the instruction dispatch unit, coupled to the detection logic, for selectively dispatching both of the next two instructions to the one execution unit during a first occurring cycle, in response to the detection logic detecting that the next two instructions are immediate instructions to the one execution unit.

Still further in accordance with the invention, instruction path directing logic is included in the one execution unit coupled to the instruction dispatch unit, for directing the first instruction of the next two instructions, received in the first cycle, to the execution decoder of the one execution unit and latching the second instruction of the next two instructions until a second occurring cycle. The instruction path directing logic also directs the first immediate operand of the first instruction to a first input of an arithmetic or logical execution block in the one execution unit during the first occurring cycle.

Still further in accordance with the invention, operand path directing logic is included in the one execution unit coupled to the instruction dispatch unit and to the general purpose register. This logic directs the first GPR operand referred to by the first instruction of the next two instructions, received in the first cycle, to a second input of the arithmetic or logical execution block and latching a second GPR operand referred to by the second instruction of the next two instructions until the second occurring cycle.

In accordance with the invention, the instruction path directing logic directs the second instruction of the next two instructions, received in the first cycle, to the execution decoder during the second occurring cycle and directs the second immediate operand of the second instruction to the first input of the arithmetic or logical execution block during the second occurring cycle. The operand path directing logic directs the second GPR operand to the second input of the arithmetic or logical execution block during the second occurring cycle.

In this manner, two instructions are dispatched in a single cycle from the instruction queue to one execution unit of the multiple execution unit parallel computer.

The invention can be applied to any execution unit of a superscaler computer, where the execution unit can process instructions containing immediate data. The invention can also be applied to the processing of more than two consecutive immediate instructions by the same execution unit.

BRIEF DESCRIPTION OF THE DRAWINGS

These and other objects, features, and advantages will be more fully appreciated with reference to the accompanying drawings.

DETAILED DESCRIPTION

Figure 1:
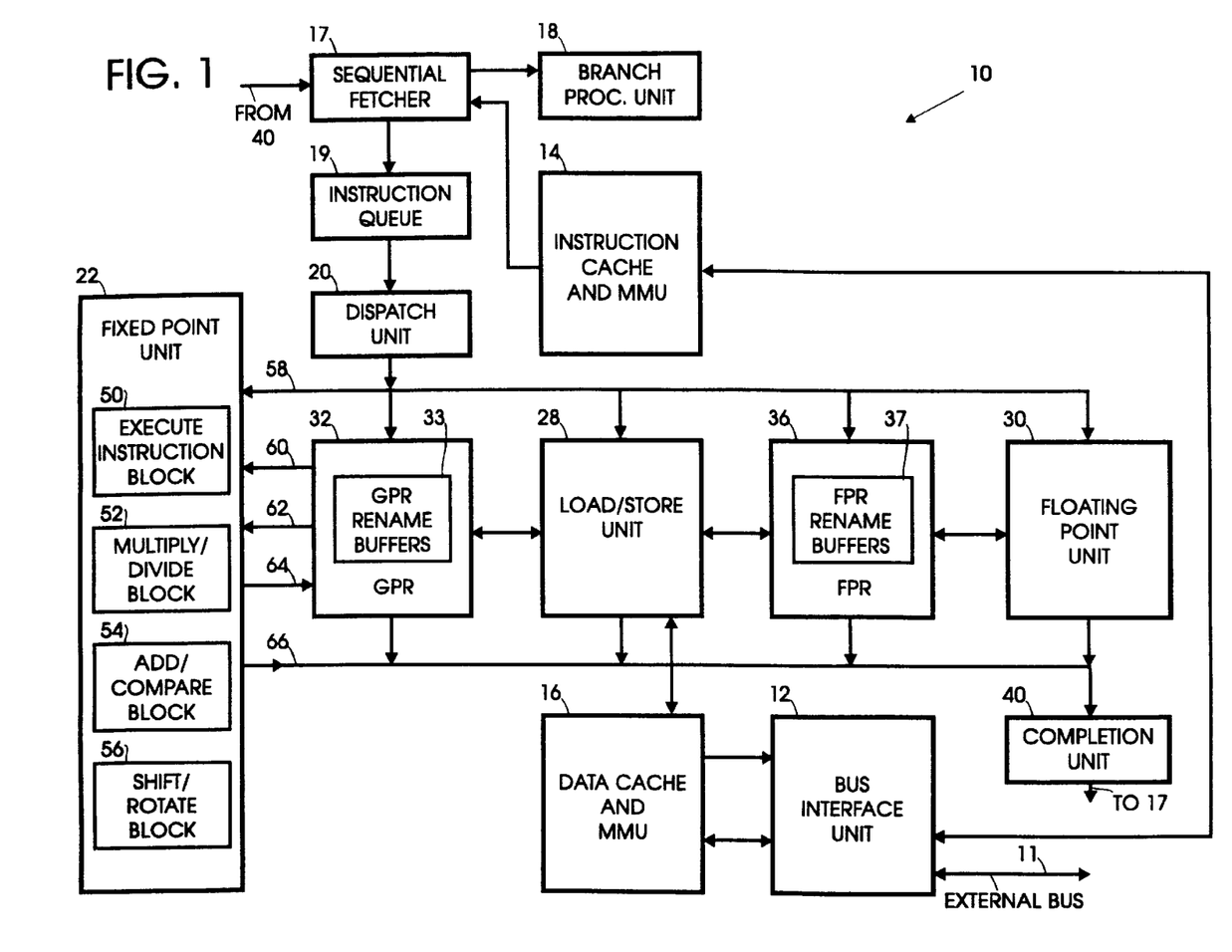
FIG. 1 is a functional block diagram of a multiple execution unit parallel professor within which the invention finds application.

The invention disclosed herein finds application in a multiple execution unit parallel computer. A superscaler, RISC processor architecture is especially suited for application of the invention. An example of a computer having such an architecture is the "PowerPC(tm) 603", which is described in the "PowerPC 603 RISC Microprocessor User's Manual", published by IBM Microelectronics and Motorola, publication number MPC603UM/AD, copyright 1994. FIG. 1 shows an overall functional block diagram of a multiple execution unit processor within which the invention finds application. The parallel processor 10 includes an instruction unit portion including a sequential fetcher 17, a branch processing unit 18, an instruction queue 19, a dispatch unit 20, and an instruction cache and memory management unit (MMU) 14. The instruction cache and MMU 14 is connected to the bus interface unit 12 which in turn is connected to the external bus 11. The instruction unit portion provides centralized control of instruction flow to the execution units.

The execution units include the fixed point unit 22, the general purpose register file 32, the load/store unit 28, the floating point register file 36, and floating point unit 30.

A data cache and memory management unit (MMU) 16 is connected to the load/store unit 28, and is also connected to the bus interface unit 12.

The fixed point unit 22 includes an execute instruction block 50, a multiply/divide block 52, an add/compare block 54, and a shift/rotate block 56.

GPR rename buffers 33 are shown associated with the GPR file 32 in FIG. 1, and FPR rename registers 37 are shown associated with the floating point register file 36 of FIG. 1.

The sequential fetcher 17 fetches the instructions from the instruction cache 14 and places them into the instruction queue 19. The branch processing unit 18 extracts branch instructions from the sequential fetcher 17 and uses static branch prediction on unresolved conditional branches to allow the fetching of instructions from a predicted target instruction stream while a conditional branch is evaluated. Instructions to be executed by the floating point unit 30, the fixed point unit 22, and the load/store unit 28 are dispatched by the dispatch unit 20.

The instruction queue 19 holds as many as six instructions. The instruction fetcher 17 continuously loads as many instructions as space allows in the instruction queue 19. Instructions are dispatched to their respective execution units from the dispatch unit 20 at a maximum rate of two instructions/cycle. The dispatch unit 20 performs source and destination register dependency checking, determines dispatch serializations, and inhibits instruction dispatching as required.

The fixed point unit 22 executes all integer instructions. The fixed point unit 22 executes one integer instruction at a time, performing computations with its arithmetic logic unit (ALU), which includes a multiply/divide block 52, an add/compare block 54, and a shift/rotate block 56. Most integer instructions are single cycle instructions. Any stalling due to contention for GPR registers 32 is minimized by the automatic allocation of rename registers 33. The system writes the contents of the rename registers 33 to the appropriate GPR register 32 when integer instructions are retired by the completion unit 40.

The load/store unit (LSU) 28 executes all load/store instructions and provides the data transfer interface between the GPR's 32, the FPR's 36, and the cache/memory subsystems 14 and 16. The load/store unit 28 calculates effective addresses, performs data alignment, and provides sequencing for load/ store string and multiple instructions.

The completion unit 40 tracks instructions from their dispatch by the dispatch unit 20 through execution by the respective execution unit, such as the fixed point unit 22. The completion unit then retires or completes the instruction in program order.

The multiple execution unit parallel processing system shown in FIG. 1 is a pipelined superscaler processor in which the processing of an instruction is reduced into discrete stages. Because the processing of an instruction is broken down into a series of stages, an instruction does not require the entire resources of an execution unit, such as the fixed point unit 22. For example, after an instruction completes the decode stage, it can pass on to the next stage, while a subsequent instruction can advance into the decode stage. This improves throughput of the instruction flow.

The instruction pipeline has four major pipeline stages. The fetch pipeline primarily involves retrieving instructions from the memory system and determining the location of the next instruction fetch. Additionally, the branch processing unit decodes branches during the fetch stage. The dispatch pipeline stage is responsible for decoding instructions supplied by the instruction fetch stage and determining which of the instructions are eligible to be dispatched in the current cycle. In addition, the source operands of the instructions are read from the appropriate register file and dispatched with the instruction to the execute pipeline stage. At the end of the dispatch pipeline stage, the dispatch instructions and the operands are latched by the appropriate execution unit.

During the execute pipeline stage, each execution unit that has an executable instruction, executes the selected instruction, writes the instruction's result in the appropriate rename register, and notifies the completion stage 40 that the instruction has finished execution. The complete/write-back pipeline stage maintains the correct architectural machine state and transfers the contents of the rename registers to the GPR's and FPR's as instructions are retired.

Figure 2:
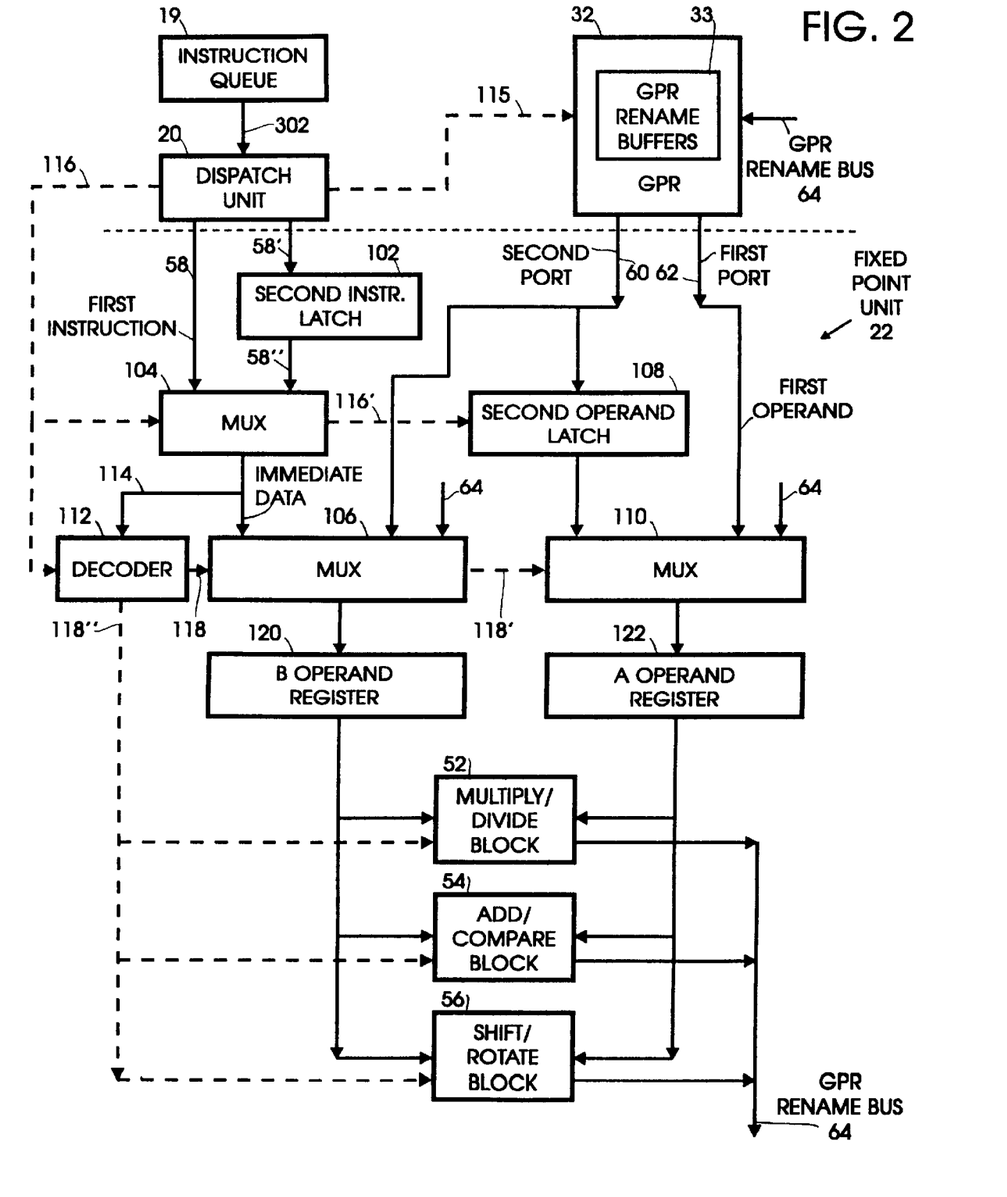
FIG. 2 is a more detailed functional block diagram of the relationship of the instruction queue and dispatch unit to the fixed point execution unit, in accordance with the invention.

FIG. 2 shows a more detailed functional block diagram of the instruction queue 19, dispatch unit 20, GPR 32, and fixed point execution unit 22. Instructions are dispatched by the dispatch unit 20, over line 58 to the multiplexer 104 shown in FIG. 2 and over line 58' to the saved instruction latch 102. GPR operands are provided over lines 60 and 62 from the GPR to the fixed point unit 22. Results from the execution units such as the fixed point unit 22 are output over the rename bus 64 to the GPR rename registers 33 shown in FIG. 1. A completion signal is ultimately output on line 66 from the respective execution unit to the completion unit 40.

FIG. 2 illustrates how the instruction queue 19 is connected by means of line 302 to the dispatch unit 20. The dispatch unit 20 has control lines 115 to the GPR 32, 116 to the multiplexer 104. The output of the dispatch unit 20 has a first instruction on line 58 to the multiplexer 104 and a second instruction on line 58' to the saved second instruction latch 102. Latch 102 is connected by line 58" to the multiplexer 104.

The GPR 32 is connected by means of line 62 to the multiplexer 110 and provides a first operand that is referred to by the first instruction on line 58. A second line 60 supplies a second operand to the second operand latch 108, the second operand being referred to by the second instruction which is on line 58'. The instruction arriving at the multiplexer 104 is delivered over line 114 to the execution decoder 112 for the fixed point execution unit 22, and the immediate data contained in the instruction is applied to the multiplexer 106. The multiplexer 106 can selectively apply either the immediate data or data from line 60 from the GPR to the B operand register 120. Also, the multiplexer 106 can selectively apply data from the rename bus 64 to the B operand register 120. The decoder 112 controls the switching state of the multiplexer 106 by means of line 118.

The multiplexer 110 selectively applies either the second operand from the second operand latch 108, or the first operand from line 62, or the values on rename bus 64, to the A operand register 122, under control of line 118' from the decoder 112.

The control line 118" from the decoder 112, controls the execution carried out in the multiply/divide block 52, the add/compare block 54, and/or the shift/rotate block 56, as they operate on the contents of the B operand register 120 and the A operand register 122. The output of the arithmetic, logic, or shift/rotate operation performed on these respective blocks 52, 54, 56, is applied to the GPR rename bus 64.

Figure 3:
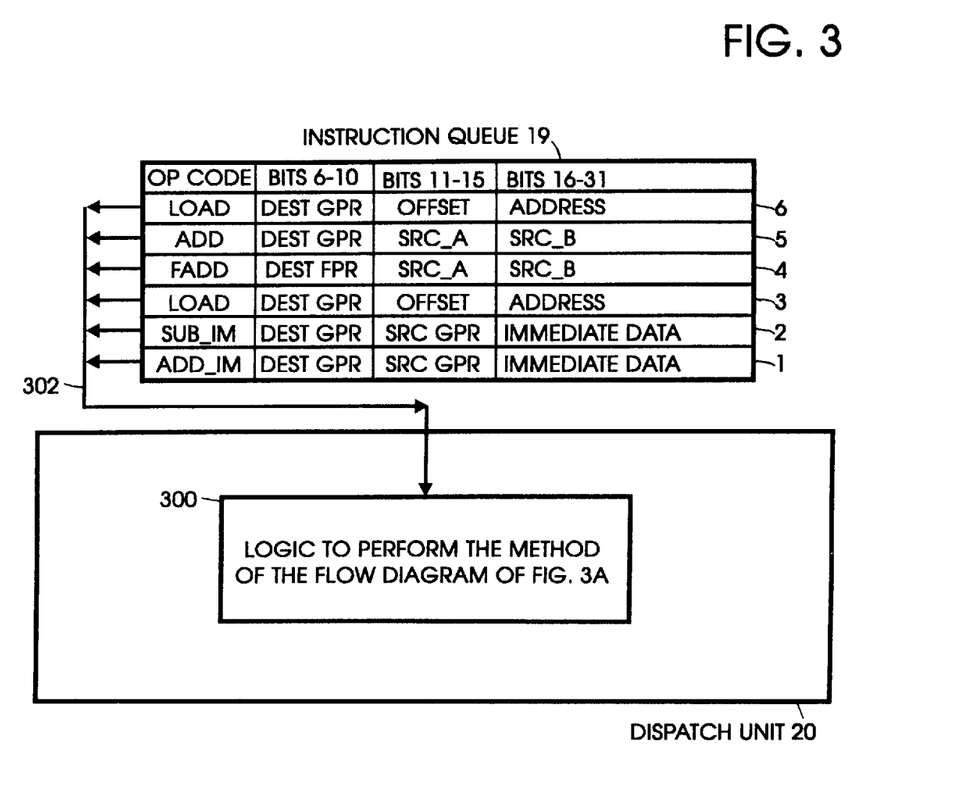
FIG. 3 is a functional block diagram of the instruction queue 19 and dispatch unit 20.

FIG. 3 is a more detailed functional block diagram of the instruction queue 19 and dispatch unit 20, in accordance with the invention. The dispatch unit's logic 300 is depicted as a flow diagram of the operation of the dispatch unit in FIG. 3A, in accordance with the invention. The instruction queue 19 includes six instruction storage locations. The particular instructions shown in the example of FIG. 3 are shown in locations 1, 2, 3, 4, 5 and 6 of instruction queue 19. The next occurring instruction is the add/immediate instruction "ADD-IM" in location 1. Bits 6–10 designate the destination GPR, bits 11–15 designate the source GPR for a single GPR operand. Bits 16–31 store immediate data as a part of the instruction. Location 2 in the instruction queue 19, has another immediate instruction, the subtract immediate instruction "SUB-IM". It includes a destination GPR designation, a source GPR, and immediate data. The location 3 in the instruction queue 19 contains a load instruction "LOAD". The load instruction includes a destination GPR, an address offset value, and an address value. It is interesting to note the distinction between the immediate instruction in locations 1 and 2 and the conventional add instruction "ADD" shown in location 5. The add instruction in location 5 includes a destination GPR designation, a source designation for a first "A" operand and a second source designation for a second "B" GPR operand. Two GPR operands are required for the add instruction "ADD" in location 5. Location 4 in the instruction queue 19 contains a floating point add instruction "FADD".

The dispatch unit 20 is connected by means of the line 302 to the instruction queue 19, which makes available to the dispatch unit 20 the primary op codes for each respective instruction stored in the instruction queue 19. The logic step 304 in FIG. 3A of the dispatch unit 20 determines whether the next two instructions in the instruction queue 19 are to be directed to diverse execution units. If the answer is yes, then the dispatch unit 20 dispatches both instructions to the two different execution units during the same cycle with the logic step 306. If the answer to the logic step 304 is no, then the logic step 307 becomes operational.

Figure 3A:
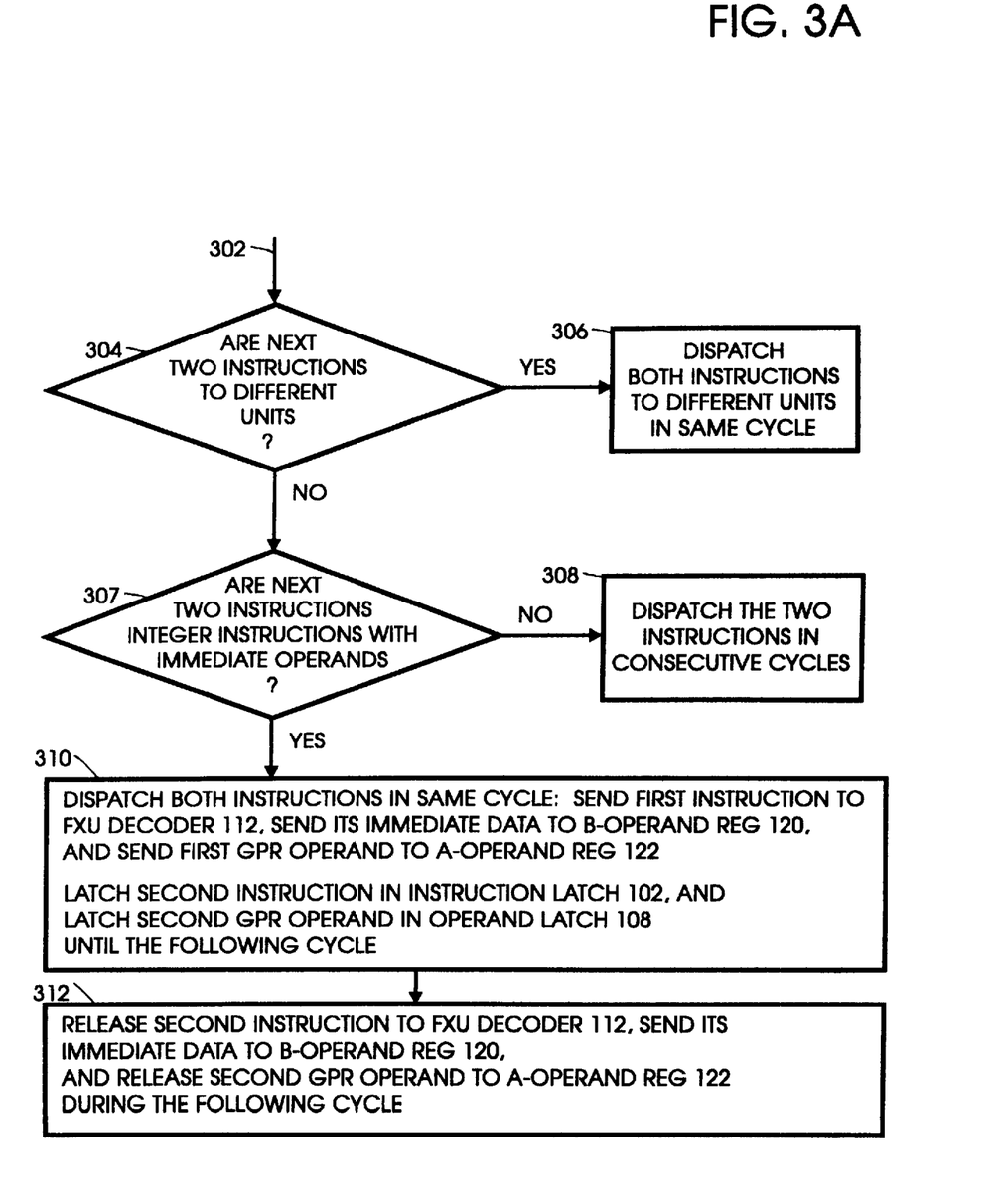
FIG. 3A is a flow diagram of the method performed by the dispatch unit 20 of FIG. 3.

The logic step 307 determines if the next two instructions in the instruction 19 are integer instructions with immediate operands. If the answer is no, then logic step 308 dispatches the two instructions in consecutive cycles to the fixed point unit 22. However, if the answer is yes, then the logic step 310 becomes active.

The logic step 310 has the dispatch unit 20 dispatch both instructions in the same cycle. The dispatch unit 20 sends the first instruction to the fixed point unit decoder 112, it sends the instruction's immediate data to the B operand register 120, and it sends the first GPR operand which is referred to by the instruction, to the A operand register 122. Then the dispatch unit 20 latches the second instruction in the second instruction latch 102, it latches the second GPR operand which is referred to by the second instruction, into the operand latch 108 until the following cycle.

Then the logic step 312 of the dispatch unit 20 takes effect. During the following cycle, the dispatch unit 20 causes the release of the second instruction, from the second instruction latch 102'to the fixed point unit decoder 112, and it sends the immediate data from the second instruction to the B operand register 120. The dispatch unit 20 also causes the release of the second GPR operand from the second operand latch 108 to the A operand register 122.

The following are some examples of integer immediate instructions having one operand incorporated into the instruction itself:

Add immediate "ADDI" (referred to above as "ADD-IM"),
Add immediate shifted "ADDIS",
Add immediate carrying "ADDIC",
Add immediate carrying and record "ADDIC.",
Subtract from immediate carrying "SUBFIC" (referred to above as "SUB-IM"),
Multiply low immediate "MULLI",
Compare immediate "CMPI",
Compare logical immediate "CMPLI",
AND immediate "ANDI.",
AND immediate shifter "ANDIS.",
OR immediate shifted "ORIS",
Exclusive or immediate "XORI",
Exclusive or immediate shifted "XORIS".

Each of these arithmetic and logical instructions are executable in the fixed point unit 22. Additional information about these instructions can be found in the PowerPC 603 RISC Microprocessor User's Manual cited above. If two or more immediate instructions, drawn from the list of immediate instructions recited above, occur in the instruction queue 19, they will be dispatched in pairs to the fixed point execution unit 22 during the same instruction cycle, in accordance with the invention.

If two consecutive immediate instructions directed to the fixed point execution unit 22 are dependant on each other, they can also be dispatched during the same instruction cycle in accordance with the invention. For example, let a first add/immediate "ADD-IM" instruction produce a result which is designated for storage in a particular destination GPR register 32, let the next occurring instruction be another immediate instruction, for example a subtract instruction "SUB-IM", which uses as its source GPR operand the same GPR register 32 that was designated as the destination operand for the first instruction. The result from the execution of the first instruction will be present on the rename bus 64 and is available at the multiplexer 110 in FIG. 2 for application as the A operand for the next occurring, subtract immediate instruction. Thus, it is seen that consecutive immediate instructions which are dependant on one another can be dispatched in the same instruction cycle, in accordance with the invention. The immediate operand for the second instruction will be applied through the multiplexer 106 as the B operand, as has been described above.

Figure 4A:
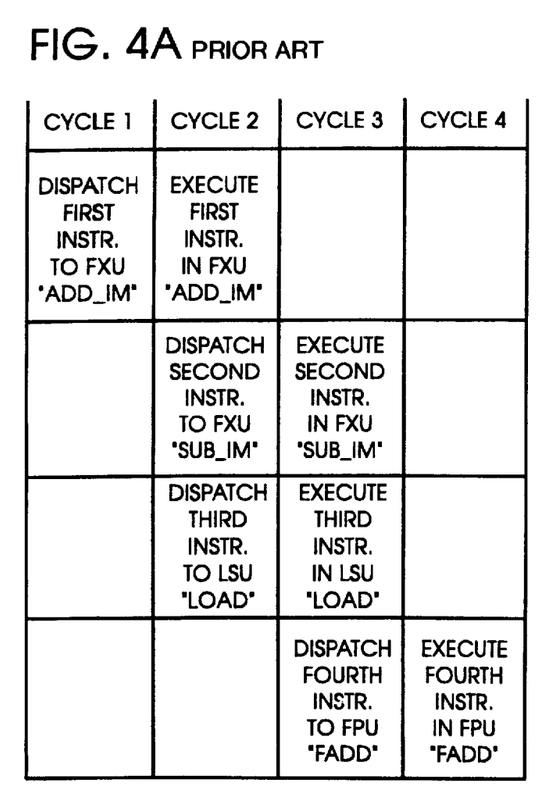
FIG. 4A is a cycle timing diagram illustrating an example of the execution of two consecutive immediate instructions followed by a load instruction and an add instruction, without the use of the invention.
Figure 4B:
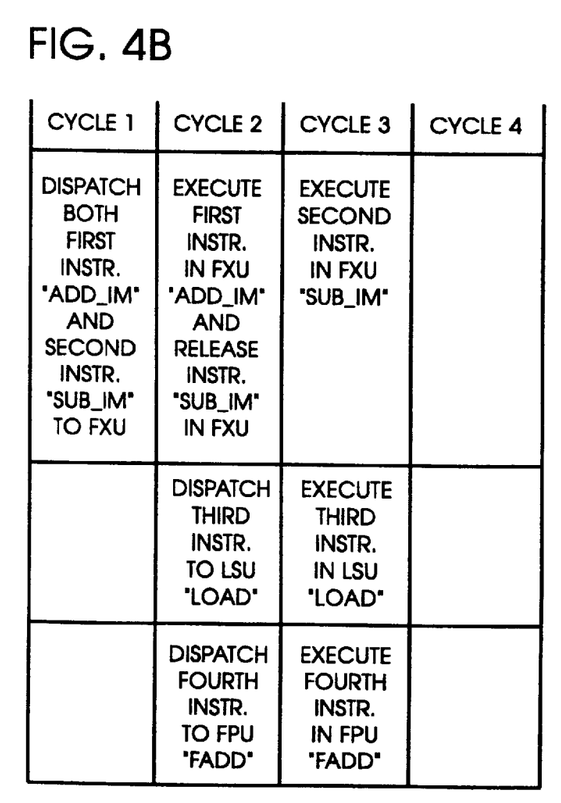
FIG. 4B is a cycle timing diagram similar to FIG. 4A illustrating the quicker execution of two consecutive immediate instructions followed by a load instruction and an add instruction, when using the invention.

Turning now to FIGS. 4A and 4B, the cycle timing diagrams describe the improvement in performance provided by the invention. In FIG. 4A, the cycle timing diagram for an existing superscaler processor is shown where an example of four consecutive instructions are applied by the instruction queue 19 to the dispatch unit 20. The first occurring instruction is an add/immediate instruction "ADD-IM", the second occurring instruction is a subtract/immediate "SUB-IM", the third occurring instruction is a load instruction "LOAD", and the fourth occurring instruction is a floating point add "FADD". During "cycle 1" of FIG. 4A, the prior art superscaler dispatch unit 20 dispatches the first add/immediate instruction "ADD-IM" to the fixed point unit 22. During "cycle 2", the fixed point unit 22 executes the add/immediate instruction and the dispatch unit 20 dispatches the second and third instructions which are a subtract/immediate "SUB-IM" instruction and a load "LOAD" instruction, respectively. During "cycle 3", the subtract/immediate and load instructions are executed in the fixed point execution unit 22 and the load/store unit 28, respectively. The dispatch unit 20 dispatches during "cycle 3" the fourth instruction which is the floating point add instruction "FADD". Thus, it is not until "cycle 4", the fourth processor cycle, that the floating point add instruction "FADD" is executed in the floating point unit 30.

Compare this now with the same example shown in FIG. 4B as it is applied to a superscaler processor which incorporates the invention disclosed herein. In FIG. 4B, in "cycle 1", the dispatch unit 20 sends two consecutive immediate instructions "ADD-IM" and "SUB-IM" to the fixed point execution unit 22. This is accomplished by detecting two consecutive instructions in the instruction queue 19. In response, both instructions are simultaneously dispatched by dispatch unit 20 to the fixed point execution unit 22. The add/immediate instruction "ADD-IM" and the subtract/immediate instruction "SUB-IM" are both dispatched by the dispatch unit 20 to the fixed point unit 22 during "cycle 1". The first instruction, which is the add immediate "ADD-IM" instruction, is directed over line 58 to the multiplexer 104 where it is further directed over line 114 to the decoder 112. The immediate data in the add immediate instruction is applied through the multiplexer 106 as the B operand in the register 120 of the fixed point execution unit. The dispatch unit 20 also signals the GPR 32, referred to by the first instruction, to issue the first GPR operand from the first port on line 62 to the multiplexer 110 and the first GPR operand is applied as the A operand to the register 122 in the fixed point unit 22. Also during the first cycle, the dispatch unit 20 dispatches the second immediate instruction, which is the subtract immediate instruction "SUB-IM", over the line 58' to the second instruction latch 102 where it is saved until the second occurring cycle. Similarly, the dispatch unit 20 signals the GPR 32 to issue the second GPR operand, referred to by the second instruction, from the second GPR port on line 60, to the second operand latch 108 where it is saved until the second occurring cycle.

Next in FIG. 4B during "cycle 2", the second processor cycle, the first immediate instruction which is the add/immediate instruction "ADD-IM", is executed in the fixed point unit 22. Since the dispatch unit 20 is now free, it may handle a third and fourth occurring instructions in the instruction queue 19. The dispatch unit 20 therefore dispatches both the load instruction "LOAD" during the "cycle 2", and the floating point add instruction "FADD", to the load/store unit 28 and to the floating point unit 30, respectively. Note that dispatch of the floating point add instruction "FADD" occurs a full cycle earlier in FIG. 4B for the invention, than it did in FIG. 4A for prior superscaler processors. During the "cycle 2", in FIG. 4B, the second instruction, which is the subtract/immediate instruction "SUB-IM", is released from the second instruction latch 102 to the over line 58" to the multiplexer 104. The op code is applied over in line 114 to the execution decoder 112. The immediate data for the subtract/immediate instruction "SUB-IM" is applied through the multiplexer 106 as the operand in the B operand register 120. Also during the "cycle 2", the second operand which was referred by the subtract immediate instruction "SUB-IM", is released from the second operand latch 108 and is applied to the multiplexer 110 and to the A operand register 122.

Then in FIG. 4B, during "cycle 3", the third processor cycle, the second instruction which is the subtract/immediate instruction "SUB-IM" is executed in the fixed point execution unit 22, with the B operand being the immediate data for the subtract/immediate instruction and the A operand being the second operand obtained from the second operand latch 108. Also during "cycle 3", the load instruction "LOAD" is executed in the load/store unit 28 and the floating point add instruction "FADD" is executed in the floating point unit 30. Note that the execution of the floating point add instruction "FADD" occurs a full cycle earlier in FIG. 4B for the inventions than it did in the example in FIG. 4A for the prior art superscaler architecture.

Consider an alternate example where the load instruction is the fourth occuring instruction in FIGS. 4A and 4B. If there is a cache miss in attempting to load the GPR 32 with the operand designated by the fourth occuring load instruction, there is now more time available to perform a cache miss procedure than there was for prior art superscaler architectures.

Figure 5:
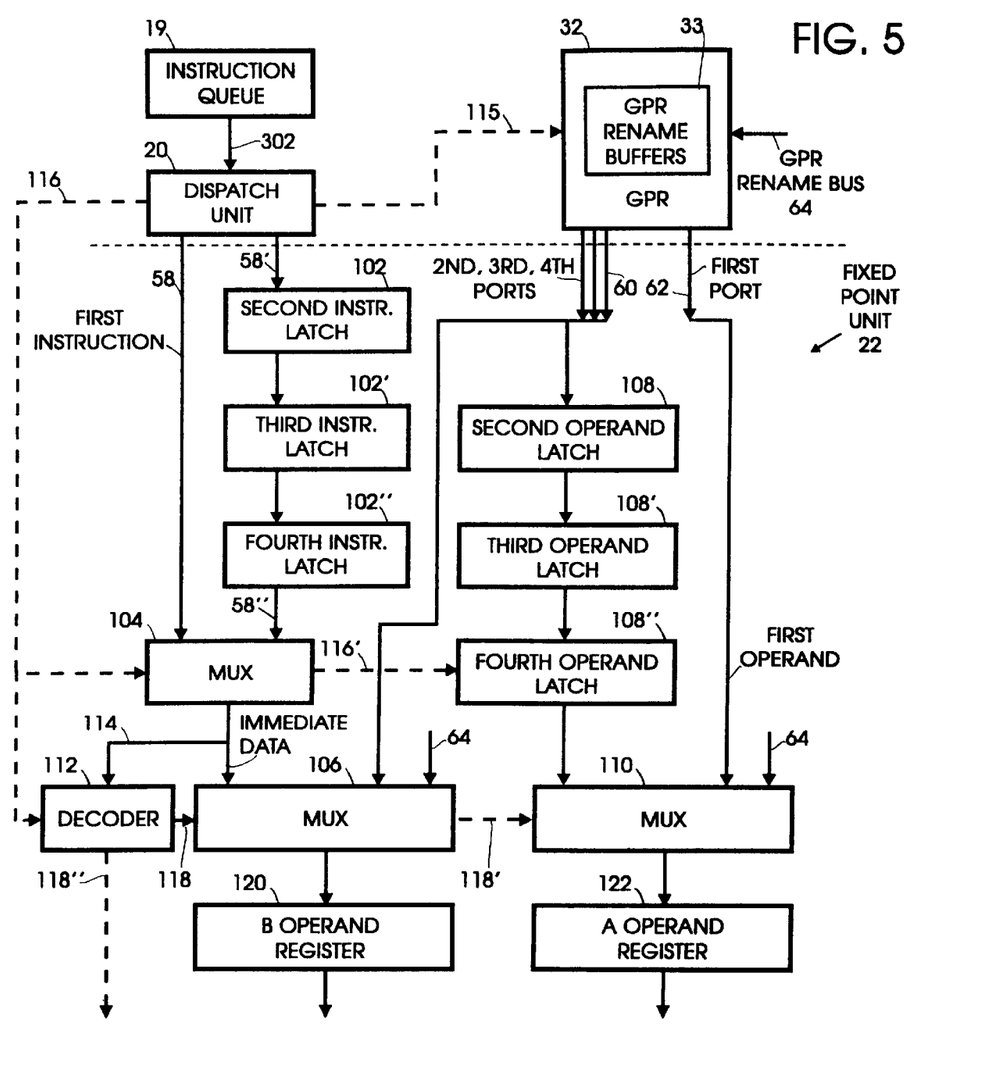
FIG. 5 is a functional block diagram of the relationship between a General Purpose Register with four read ports and the instruction queue and fixed point unit, in accordance with the invention.
Figure 6:
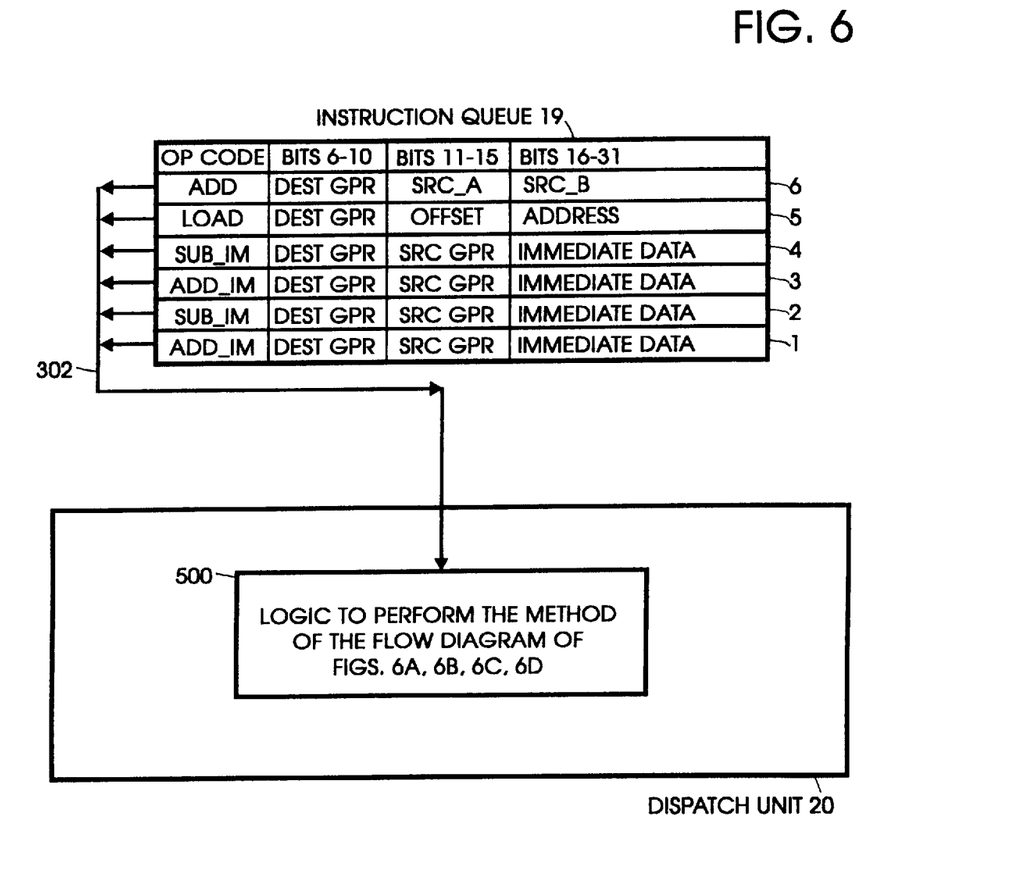
FIG. 6 is a more detailed functional block diagram of the instruction queue and dispatch unit used in conjunction with a four-read-port General Purpose Register, in accordance with the invention.
Figure 6A:
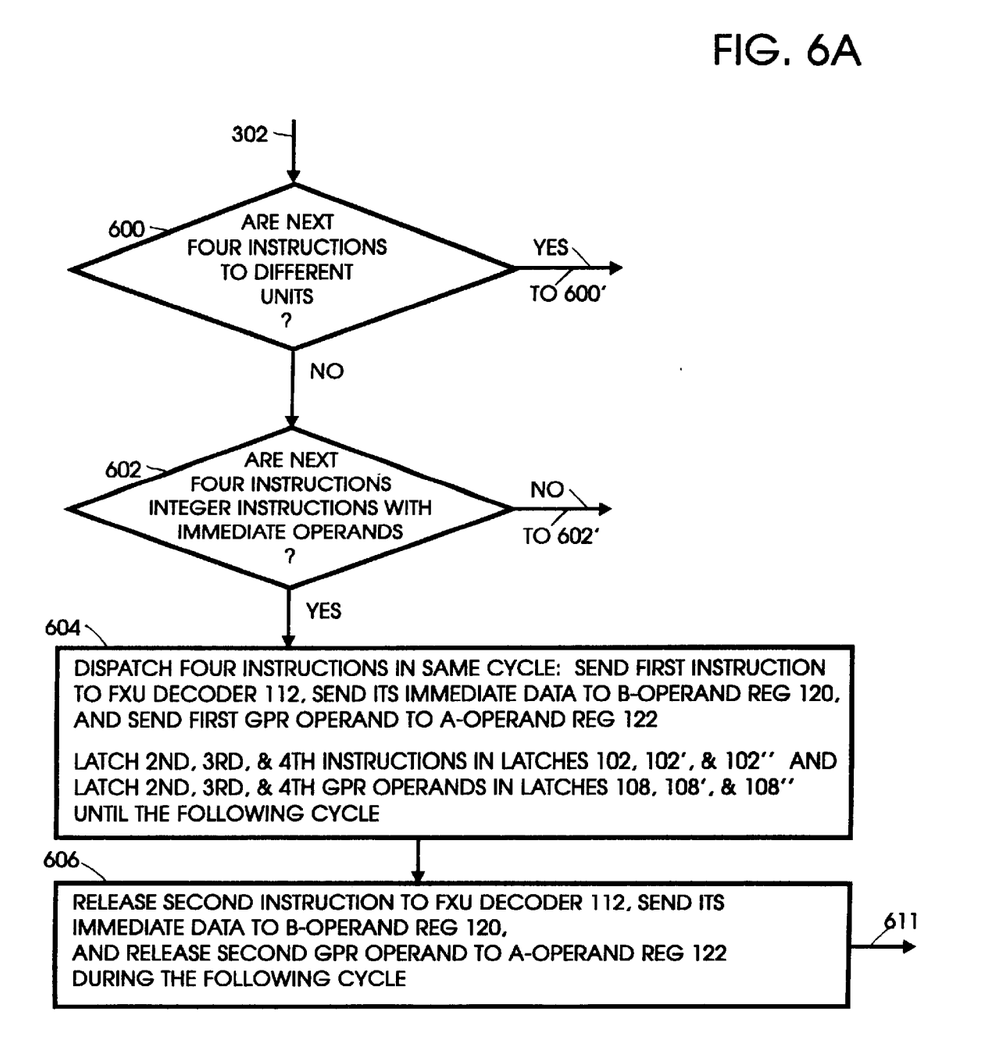
FIGS. 6A, 6B, 6C, and 6D comprise a flow diagram of the method performed by the dispatch unit 20 of FIG. 6.
Figure 6B:
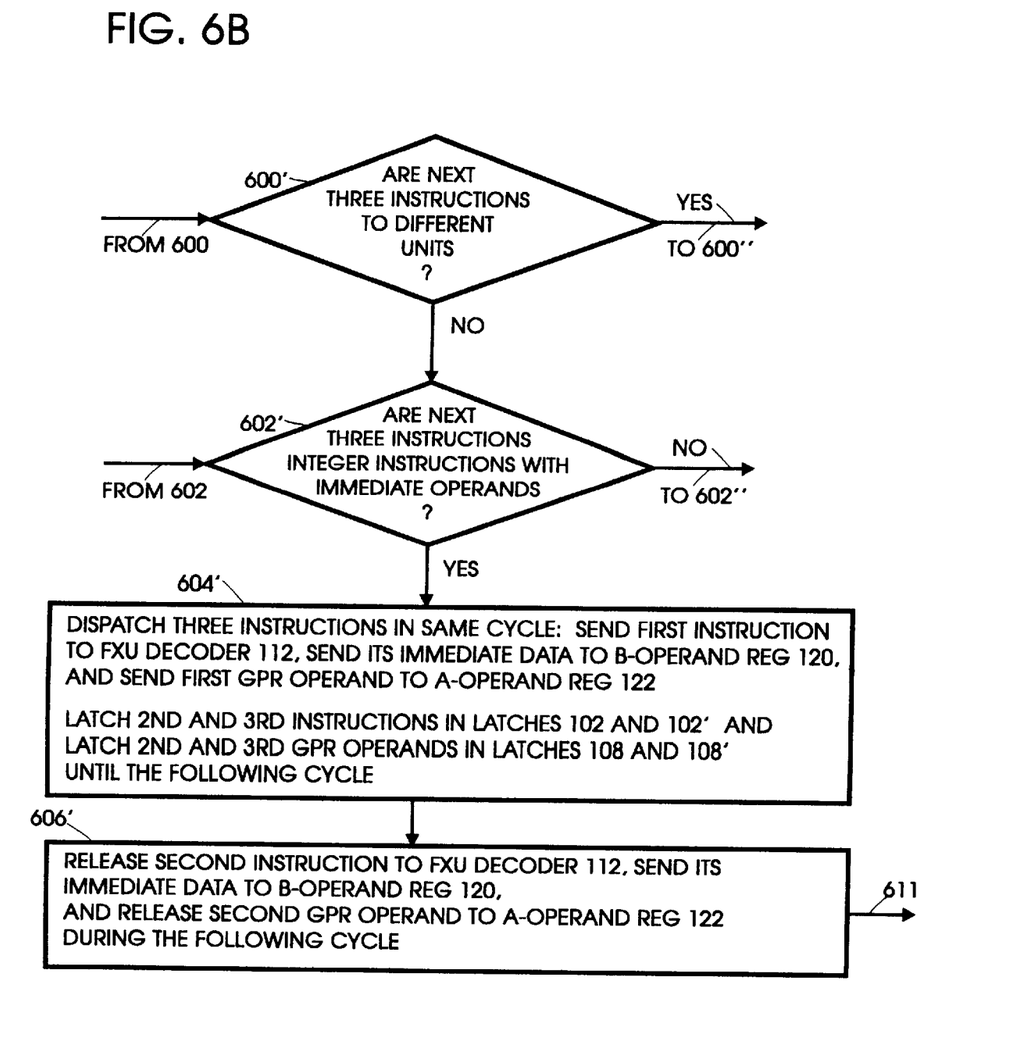
Figure 6C:
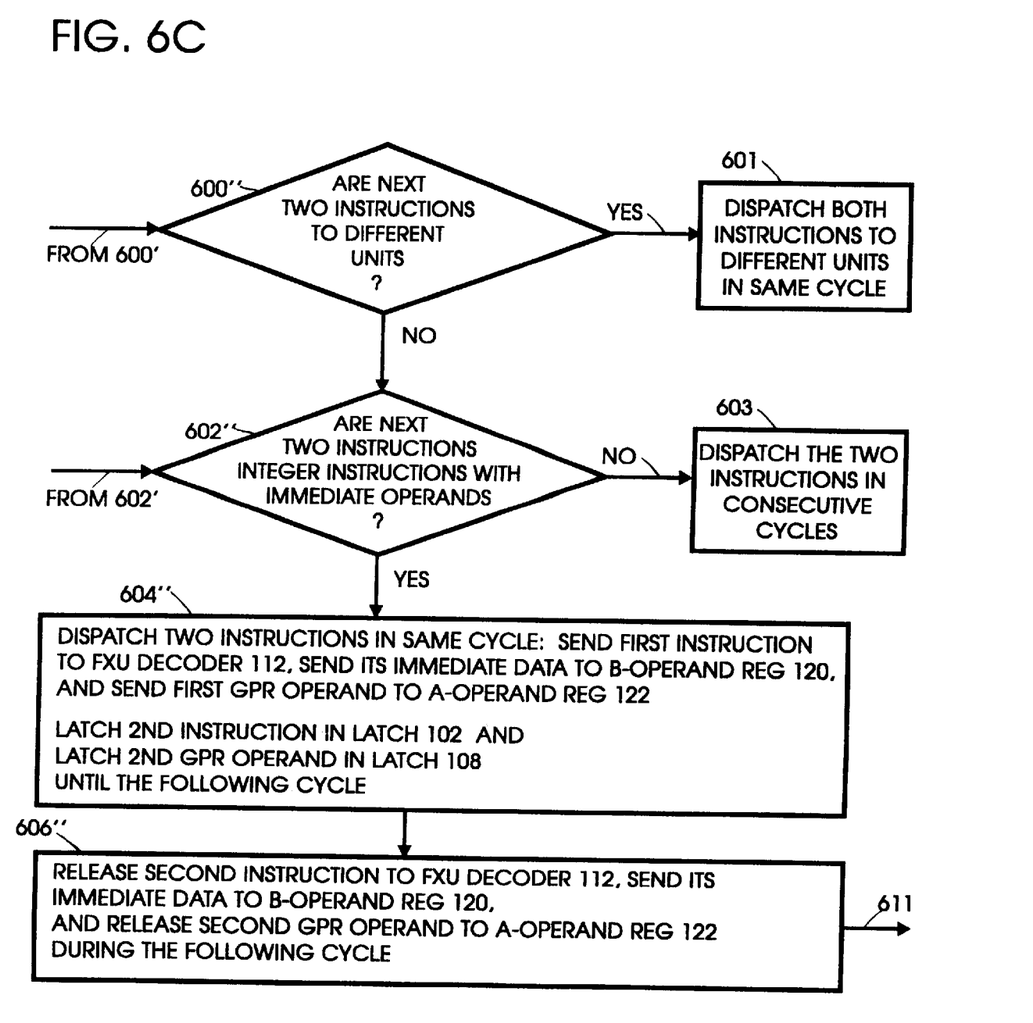
Figure 6D:
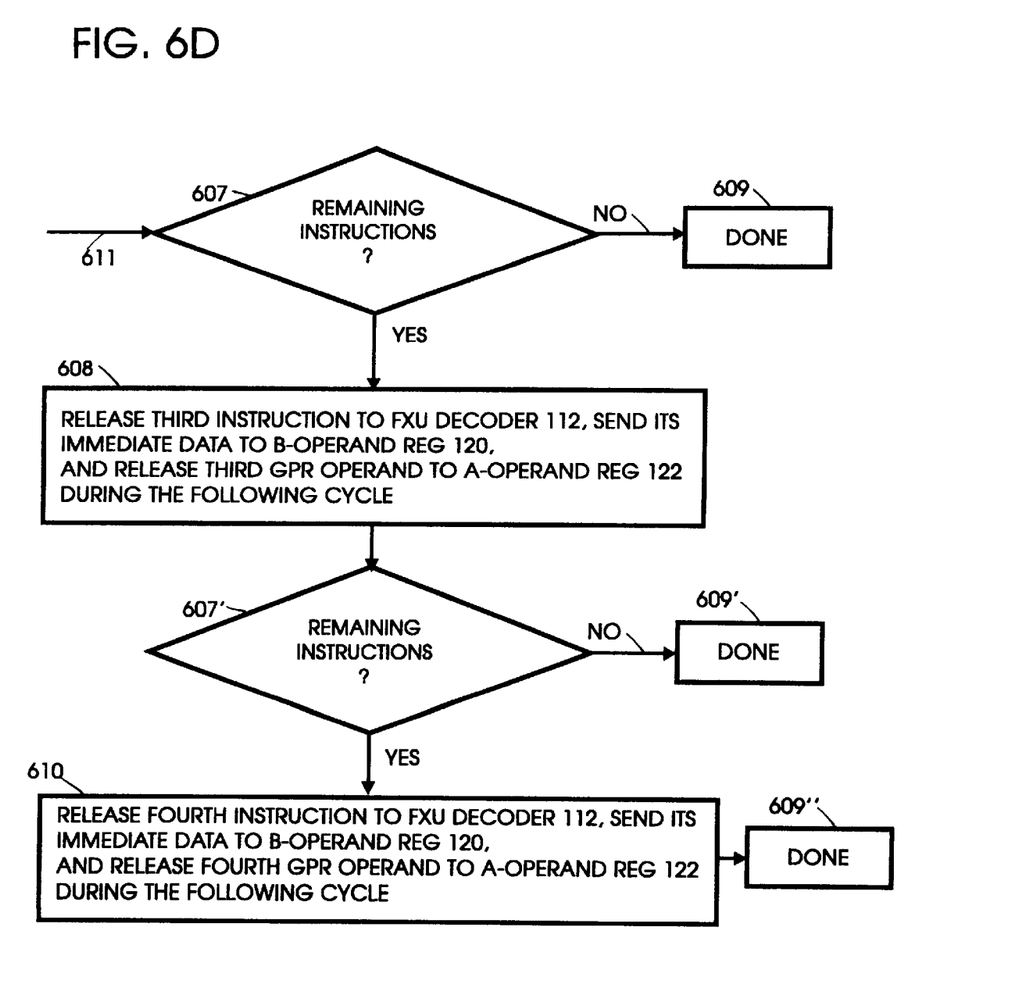

In an additional embodiment of the invention, shown in FIGS. 5 and 6, the GPR register 32 is implemented with four read ports. This is useful in superscaler architectures where the dispatch unit can issue up to four instructions during the same cycle. During execution of a single integer immediate instruction having one operand incorporated into the instruction itself, only the first read port, line 62, is necessary to supply one operand to the A operand register 122 of the fixed point unit 22. The remaining second, third, and fourth read ports of the GPR register 32 are thus unused by the first immediate instruction and are available for use in up to three subsequent integer immediate instructions.

FIGS. 6A, 6B, 6C, and 6D comprise a flow diagram of the method performed by the dispatch unit 20 of FIG. 6.

FIGS. 6A, 6B, 6C and 6D show the logic steps 600, 600', and 600" performed by the logic 500 of the dispatch unit 20, which is coupled to the instruction queue 19. They determine whether the next two, three, or four instructions in the instruction queue 19 are to be directed to diverse execution units. Logic steps 602, 602', and 602" flow from the respective logic steps 600, 600', and 600". Also, logic step 602 feeds logic step 602', which in turn feeds logic step 602", which in turn feeds logic step 603.

During operation of processor 10, if the next four instructions from the instruction queue 19 are directed to the same execution unit, then logic step 600 feeds logic step 602. Otherwise, logic step 600 goes to logic step 600'. Once at logic step 600', if the next three instructions in the instruction queue 19 are to the same execution unit, then logic step 600' activates logic step 602'. Otherwise, logic step 600' activates logic step 600". Having reached logic step 600", if the next 2 instructions in the instruction queue 19 are to the same execution unit, logic step 602" is activated. Otherwise, logic step 601 becomes active and directs the dispatch unit 20 to dispatch the next two instructions in the instruction queue 19 to different execution units in the same cycle.

Logic step 602 must be activated by logic step 600. When this occurs, logic step 602 checks to see if the next four instructions in the instruction queue 19 are integer immediate instructions. If so, logic step 604 is activated. Otherwise, logic step 602' is activated. Once logic step 602' becomes active, either by logic step 602 or by logic step 600', logic step 602' checks to see if the next three instructions in the instruction queue 19 are integer immediate instructions. If they are, logic step 604' is enabled. Otherwise, logic step 602" is enabled. When logic step 602" is enabled, either by logic step 602' or by logic step 600", logic step 602" checks to see if the next two instructions in the instruction queue 19 are integer immediate instructions. If they are, logic step 604" becomes active. Otherwise, logic step 603 causes the dispatch unit 20 to dispatch the next two instructions in the instruction queue 19 in consecutive cycles, to the same execution unit.

The outputs of logic steps 602, 602' and 602" are connected to logic steps 604, 604' and 604", respectively, as shown in FIG. 6. When logic step 604 becomes activated by logic step 602, logic step 604 causes the dispatch unit 20 to dispatch four instructions from the instruction queue 19 to the fixed point unit 22, in the same cycle. Instructions two, three and four from the instruction queue 19 are then latched in instruction latches 102, 102', and 102", respectively. Simultaneously, logic step 604 causes the dispatch unit 20 to send GPR operands at the 2nd, 3rd, and 4th ports of GPR 32 to second 108, third 108', and fourth 108" operand latches, respectively.

Similarly, when logic step 604' becomes activated by logic step 602', logic step 604' causes the dispatch unit 20 to dispatch three instructions from the instruction queue 19 to the fixed point unit 22, in the same cycle. Instructions two and three from the instruction queue 19 are then latched in instruction latches 102 and 102', respectively. Simultaneously, logic step 604' causes the dispatch unit 20 to send GPR operands at the 2nd and 3rd ports of GPR 32 to second 108 and third 108' operand latches, respectively.

Similarly, when logic step 604" becomes activated by logic step 602", logic step 604" causes the dispatch unit 20 to dispatch two instructions from the instruction queue 19 to the fixed point unit 22, in the same cycle. Instruction two from the instruction queue 19 is then latched in the second instruction latch 102. Simultaneously, logic step 604" causes the dispatch unit 20 to send the GPR operand at the 2nd port of GPR 32 to the second operand latch 108.

All of logic steps 604 through 604" cause the dispatch unit 20 to send the first instruction from the instruction queue 19 to the fixed point unit decoder 112, send the first instruction's immediate data to the B operand register 120, and send the first GPR operand from the first port of GPR 32, which is referred to by the first instruction in the instruction queue 19, to the A operand register 122.

Logic steps 606 through 610 are coupled to the outputs of 604 through 604" as shown in FIG. 6. Logic steps 606, 606' and 606" take effect in the second cycle. Logic steps 608 and 610 take effect in the following third and fourth consecutive cycles, respectively. Logic steps 606, 606', 606", 608, and 610 cause the dispatch unit 20 to release subsequent instructions latched in instruction latches 102, 102' and 102", respectively, to the decoder 112 in the fixed point unit 22. Logic steps 606, 606', 606", 608, and 610 consecutively release the immediate operand of the corresponding latched instruction to the B operand register 120. Further, logic steps 606, 606', 606", 608, and 610 consecutively release GPR operands stored in second 108, third 108', and fourth 108" operand latches which are successively dispatched to the A operand register 122. The latched instructions stored in the second 102, third 102' and fourth 102" instruction latches execute on the operands in the A 122 and B 120 operand registers in successive cycles, in the fixed point unit 22. This is performed by the logic steps 607 and 607' until all remaining latched instructions have been executed. Logic step 607 is connected by common line 611 to logic steps 606, 606', and 606" and logic step 607' is connected to logic step 608.

Thus, it can be seen from FIGS. 5 and 6 that the principle of the invention can be applied to superscaler architecture where the dispatch unit can issue a plurality of N instructions in the same cycle, where N is an integer.

The logic steps described in FIGS. 3 and 6 can be implemented in a variety of ways including with discrete components, gate array or standard cell logic for use in an Application Specific Integrated Circuit (ASIC) or in a full custom logic chip. Also, the aforesaid logic steps are suitable for implementation in a Programmable Logic Array (PLA) or a Field Programmable Gate Array (FPGA) chip. A number of circuit technologies may be used to fabricate the circuit elements used in the aforesaid logic steps including Complementary Metal Oxide Semiconductor (CMOS), Bi-Polar Junction Transistor (BJT), Silicon on Insulator (SOI) or Gallium Arsenite (GAAS).

Thus it is seen that the invention provides a significant improvement in performance for dispatching instructions in superscaler architectures. The invention can also be applied to other types of execution units, such as floating point units or functional processor units, for dispatching to them instructions that include immediate data. Further, the invention may be applied to processor architectures that dispatch more than two instructions per cycle to diverse execution units. Such processors are now prevalent, an example of which is the "PowerPC(tm) 604". This microprocessor dispatches up to four simultaneous instructions per cycle and is described in the "PowerPC 604 RISC Microprocessor User's Manual," published by IBM Microelectronics and Motorola, publication number MPC604UM/AD, copyright 1994.

Although specific embodiments of the invention have been disclosed, it will be understood by those having skill in the art that changes can be made to those specific embodiments without departing from the spirit and the scope of the invention.

What is claimed is:

1. A system for dispatching two instructions in a single cycle from an instruction queue to one execution unit of a multiple execution unit parallel computer that includes a general purpose register ("GPR") file containing GPR operands, comprising:

an instruction dispatch unit coupled to the instruction queue, including detection logic to detect whether a next two instructions in said instruction queue are immediate instructions to said one execution unit;

instruction logic in said instruction dispatch unit, coupled to said detection logic, for selectively dispatching both of said next two instructions to said one execution unit during a first occurring cycle, in response to said detection logic detecting that said next two instructions are immediate instructions to said one execution unit;

instruction path directing logic coupled to said instruction dispatch unit, for directing a first instruction of said next two instructions to a decoder of said one execution unit during said first occurring cycle and latching a second instruction of said next two instructions until a second occurring cycle;

said instruction path directing logic directing a first immediate operand of said first instruction to a first input of an arithmetic/logic unit in said one execution unit during said first occurring cycle;

operand path directing logic coupled to said instruction dispatch unit and to said general purpose register, for directing a first GPR operand referred to by said first instruction to a second input of said arithmetic/logic unit during said first occurring cycle and latching a second GPR operand referred to by said second instruction until said second occurring cycle;

said instruction path directing logic directing said second instruction to said decoder during said second occurring cycle and directing a second immediate operand of said second instruction to said first input of said arithmetic/logic unit during said second occurring cycle; and said operand path directing logic directing said second GPR operand to said second input of said arithmetic/logic unit during said second occurring cycle.

2. The system of claim 1, which further comprises:

said operand path directing logic in said one execution unit being further coupled to a result output of said arithmetic/logic unit; and said second instruction requiring as its GPR operand a result from the execution of said first instruction provided by said operand path directing logic.

3. The system of claim 1, wherein said multiple execution unit parallel computer is a RISC superscaler microprocessor.

4. The system of claim 1, wherein said one execution unit is a fixed point instruction execution unit.

5. The system of claim 1, wherein said first instruction is for an arithmetic operation which is different from the operation of said second instruction.

6. The system of claim 1, which further comprises:

said instruction dispatch unit including detection logic to detect whether a next three instructions in said instruction queue are immediate instructions to said one execution unit;

said instruction logic in said instruction dispatch unit selectively dispatching said next three instructions to said one execution unit during said first occurring cycle, in response to said detection logic detecting that said next three instructions are immediate instructions to said one execution unit;

said instruction path directing logic in said one execution unit directing a first instruction of said next three instructions to said decoder of said one execution unit during said first occurring cycle and latching said second and a third instruction of said next three instructions until said second and a third occurring cycles;

said instruction path directing logic directing said first immediate operand of said first instruction to said first input of said arithmetic/logic unit in said one execution unit during said first occurring cycle;

said operand path directing logic in said one execution unit directing said first GPR operand referred to by said first instruction to said second input of said arithmetic/logic unit during said first occurring cycle, latching said second and a third GPR operands referred to by said second and third instructions, respectively, of said next three instructions until said second occurring cycle and holding said third GPR operand until said third occurring cycle;

said instruction path directing logic directing said second instruction of said next three instructions to said decoder during said second occurring cycle and directing a second immediate operand of said second instruction to said first input of said arithmetic/logic unit during said second occurring cycle;

said operand path directing logic directing said second GPR operand to said second input of said arithmetic/logic unit during said second occurring cycle;

said instruction path directing logic directing said third instruction of said next three instructions to said decoder during said third occurring cycle and directing a third immediate operand of said third instruction to said first input of said arithmetic/logic unit during said third occurring cycle; and said operand path directing logic directing said third GPR operand to said second input of said arithmetic/logic unit during said third occurring cycle.

7. A method for dispatching two instructions in a single cycle from an instruction queue to one execution unit of a multiple execution unit parallel computer that includes a general purpose register ("GPR") file containing GPR operands, comprising the steps of:

detecting whether a next two instructions in said instruction queue are immediate instructions to said one execution unit;

selectively dispatching both of said next two instructions to said one execution unit during a first occurring cycle, in response to detecting that said next two instructions are immediate instructions to said one execution unit;

directing a first instruction of said next two instructions to a decoder of said one execution unit during said first occurring cycle and latching a second instruction until a second occurring cycle;

directing a first immediate operand of said first instruction to a first input of an arithmetic/logic unit in said one execution unit during said first occurring cycle;

directing a first GPR operand referred to by said first instruction to a second input of said arithmetic/logic unit during said first occurring cycle and latching a second GPR operand referred to by said second instruction until said second occurring cycle;

directing said second instruction to said decoder during said second occurring cycle and directing a second immediate operand of said second instruction to said first input of said arithmetic/logic unit during said second occurring cycle; and directing said second GPR operand to said second input of said arithmetic/logic unit during said second occurring cycle.

8. The method of claim 7, which further comprises:

providing a result from the execution of said first instruction as a GPR operand for said second instruction.

9. The method of claim 7, wherein said multiple execution unit parallel computer is a RISC superscaler microprocessor.

10. The method of claim 7, wherein said one execution unit is a fixed point instruction execution unit.

11. The method of claim 7, wherein said first instruction is for an arithmetic operation which is different from the operation of said second instruction.

12. A system for dispatching two instructions in a single cycle from an instruction queue to one execution unit of a multiple execution unit parallel computer that includes a general purpose register ("GPR") file containing GPR operands, comprising:

dispatch means coupled to the instruction queue, including detection means for detecting whether a next two instructions in said instruction queue are immediate instructions to said one execution unit;

instruction means in said dispatch means, coupled to said detection means, for selectively dispatching both of said next two instructions to said one execution unit during a first occurring cycle, in response to said detection means detecting that said next two instructions are immediate instructions to said one execution unit;

instruction path directing means coupled to said dispatch means, for directing a first instruction of said next two instructions to decoding means in said one execution unit during said first occurring cycle and storing a second instruction of said next two instructions with latching means until a second occurring cycle;

said instruction path directing means directing a first immediate operand of said first instruction to a first input of arithmetic/logic means in said one execution unit during said first occurring cycle;

operand path directing means coupled to said dispatch means and to said general purpose register, for directing a first GPR operand referred to by said first instruction to a second input of said arithmetic/logic means during said first occurring cycle and storing a second GPR operand referred to by said second instruction with a second latching means until said second occurring cycle;

said instruction path directing means directing said second instruction to said decoding means during said second occurring cycle and directing a second immediate operand of said second instruction to said first input of said arithmetic/logic means during said second occurring cycle;

said operand path directing means directing said second GPR operand to said second input of said arithmetic/logic means during said second occurring cycle.

13. The system of claim 12 which further comprises:

said dispatch means issuing a plurality of N instructions per cycle; and said instruction path directing means directing a first instruction to said one execution unit during said first cycle and storing up to N-1 instructions until a second occurring cycle, where N is an integer.

14. A system, comprising:

a set of registers for storing operands;

an execution unit coupled to said set of registers for executing first and second instructions and for inputting up to m number of said operands from said set of registers in a single cycle in response to said instructions; and a dispatch unit coupled to said execution unit for dispatching said first and second instructions to said execution unit during a first cycle if detection of a number n of said operands collectively specified by said first and second instructions is less than m+1.

15. The system of claim 14 wherein said dispatch unit is operable to dispatch said first and second instructions to said execution unit during said first cycle in response to at least one of said first and second instructions specifying immediate operand information such that n is less than m+1.

16. The system of claim 14 wherein said dispatch unit is operable to dispatch said first and second instructions to said execution unit during said first cycle in response to each of said first and second instructions specifying respective immediate operand information such that n is less than m+1.

17. The system of claim 14 wherein said execution unit is coupled through m number of ports to said set of registers such that said execution unit is operable to input up to m number of said operands from said set of registers in a single cycle.

18. The system of claim 14 wherein said execution unit comprises:

circuitry for initiating execution of said first instruction during a second cycle after said first cycle and of said second instruction during a third cycle after said second cycle; and circuitry for latching said second instruction during said second cycle.

19. The system of claim 18 wherein said execution unit comprises circuitry for inputting at least one of said operands from at least one of said registers in response to said second instruction and for latching said input operand during said second cycle.

20. The system of claim 18 wherein said first cycle and said second cycle are integral with one another.

* * * * *

UNITED STATES PATENT AND TRADEMARK OFFICE
CERTIFICATE OF CORRECTION

PATENT NO. : 5,870,577
DATED : February 9, 1999
INVENTOR(S) : Rajesh B. Patel; Soummya Mallick; Romesh Mangho Jessani It is certified that error appears in the above-identified patent and that said Letters Patent is hereby corrected as shown below:

On the title page,

At [73] add the following to the assignee information:

--and Motorola, Incorporated, Schaumburg, Ill. --

Signed and Sealed this

Twenty-fifth Day of April, 2000

Attest:

Q. TODD DICKINSON

Attesting Officer

Director of Patents and Trademarks